United States Patent
Binder et al.

(10) Patent No.: US 7,566,674 B2
(45) Date of Patent: Jul. 28, 2009

(54) DENTAL CERAMICS AND METHOD FOR THE MANUFACTURE THEREOF

(75) Inventors: Joachim Binder, Karlsruhe (DE);
Jürgen Hausselt, Germersheim (DE);
Hans-Joachim Ritzhaupt-Kleissl, Walldorf (DE); Nadja Schlechtriemen, Linkenheim-Hochstetten (DE); Stefan Stolz, Waldershof (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 11/705,341

(22) Filed: Feb. 12, 2007

(65) Prior Publication Data

US 2007/0142206 A1 Jun. 21, 2007

Related U.S. Application Data

(63) Continuation-in-part of application No. PCT/EP2005/009854, filed on Sep. 14, 2005.

(30) Foreign Application Priority Data

Sep. 21, 2004 (DE) .................. 10 2004 045 752

(51) Int. Cl.
*C04B 35/48* (2006.01)
*C04B 35/49* (2006.01)
*C09K 3/00* (2006.01)

(52) U.S. Cl. .................. 501/105; 501/102; 501/103; 501/104; 501/107; 106/35

(58) Field of Classification Search .............. 501/102, 501/64, 66, 67, 103, 104, 105, 107; 106/35
See application file for complete search history.

(56) References Cited

U.S. PATENT DOCUMENTS

| | | | | |
|---|---|---|---|---|
| 3,973,972 A | * | 8/1976 | Muller | 501/4 |
| 5,641,347 A | * | 6/1997 | Grabowski et al. | 106/35 |
| 6,022,819 A | * | 2/2000 | Panzera et al. | 501/20 |
| 6,168,435 B1 | * | 1/2001 | Beaty et al. | 433/172 |
| 6,291,378 B1 | * | 9/2001 | Evans et al. | 501/88 |
| 6,297,181 B1 | * | 10/2001 | Kunert et al. | 501/57 |

FOREIGN PATENT DOCUMENTS

| | | | |
|---|---|---|---|
| DE | 202004005782 | * | 8/2004 |
| DE | 20 2004 005 782 | | 9/2004 |
| DE | 1 568 667 | | 8/2005 |
| EP | 0 631 995 | | 1/1995 |
| EP | 0 690 031 | | 6/1995 |
| WO | 2006/032394 | | 3/2006 |

OTHER PUBLICATIONS

Hennige et al. Shrinkage-free ZrSiO4-ceramics: Characterisation and Applications. Journal of the European Ceramic Society 19 (1999) p. 2901-2908.*

* cited by examiner

*Primary Examiner*—Karl E Group
*Assistant Examiner*—Noah S Wiese
(74) *Attorney, Agent, or Firm*—Klaus J. Bach

(57) ABSTRACT

In dental ceramics containing zirconium dioxide and silicondioxide with a Zr/Si ratio of between 0.5 and 1.0, 1 to 12 wt % of aluminum oxide and up to 2 wt % of an alkali- or earth alkali metal oxide, those materials are selectively mixed with yttrium-stabilized zirconium dioxide with a Zr/Si ratio of the mixture being between 0.5 and 1 wt % and also a silicon organic compound as well as a compression aid, and a green body is formed from the mixture by milling, which green body is then sintered.

11 Claims, 1 Drawing Sheet

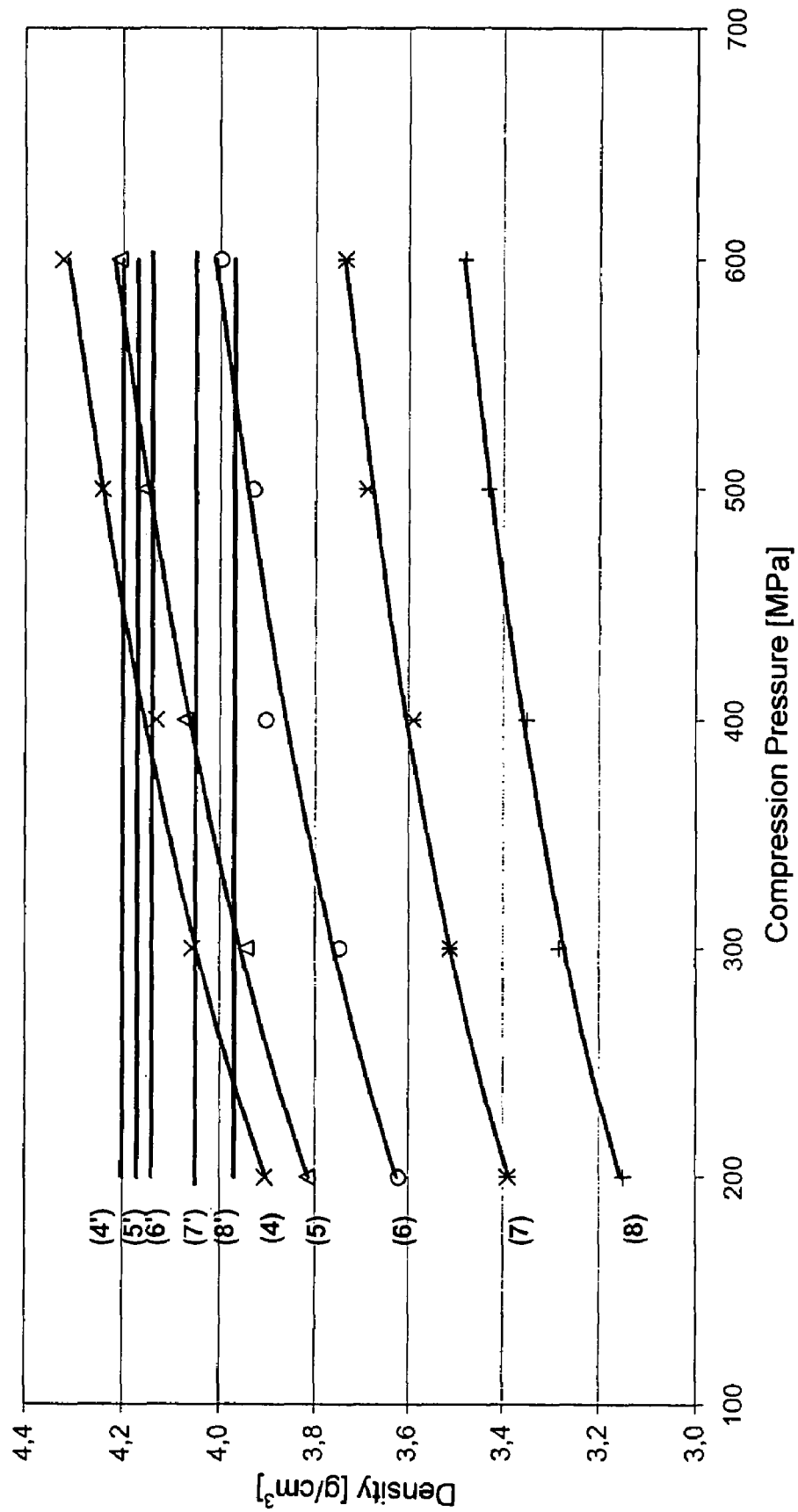

DENTAL CERAMICS AND METHOD FOR THE MANUFACTURE THEREOF

This is a Continuation-in-Part Application of International Application PCT/EP2005/009854 filed Sep. 14, 2005 and claiming the priority of German Application 10 2004 045 752.2 filed Sep. 21, 2004.

BACKGROUND OF THE INVENTION

The invention relates to dental ceramics and a method for the manufacture thereof.

Ceramics which are suitable as dental ceramics for use in dental preparations has to satisfy special requirements. They should have particularly little chemical solubility and a color that can be adjusted to the basic dental colors or color adjustment using coloring agents.

The German DIN EN ISO 6872 sets the upper limit for the chemical solubility of dental ceramics as 100 µg/cm$^2$.

The color is characterized according to the CIE-L*a*b*-system of the Commision Internationale de l'Eclairage (CIE), Vienna, 1986. In this system, the following parameters are used:
L* the lightness perception
A* the red-green perception wherein a*>0 is a red and a*<0 is a green perception
B* the yellow-blue perception, wherein b*>0 is a yellow, and
b*<0 is a blue perception in each case of the retina of the human eye.

For fully ceramic artificial teeth silicate- or oxide-ceramics are suitable, wherein the oxide ceramics, in comparison for example with so-called press ceramics, cannot be brought simply into a desired shape. From ceramic powders first so-called green bodies are manufactured which are subsequently sintered. During sintering of the porous green bodies, the powder particles are densified to form a solid ceramic structure wherein however necessarily a volume shrinkage of up to 50% occurs. This sinter shrinkage must be taken into consideration during the manufacture of the ceramic tooth replacements.

DE 195 47 129 discloses a method for a shrinkage-free manufacture of oxide-ceramic sinter bodies of powder-like oxide ceramics such as zirconium dioxide or aluminum oxide, a powder-like inter-metallic compound and a silicon organic polymer. However, not every possible composition results in a ceramic structure which satisfies the above-mentioned requirements for dental ceramics. Generally, ceramics manufactured in this way are not white but greenish-yellow and the chemical solubility thereof is excessively high.

In accordance with J. R. Binder, S. Ray and E. Klose, "Schwindungsfreie Kermiken im System Zr—Si—O" (Shrinkage-free Ceramics in the system Zr—Si—O) DKG manual, chapter 3, 6, 4.4, 2002, the manufacture of shrinkage-free ceramics in the system zirconium-silicon-oxide (Zr—Si—O) is based on the compensation of the shrinkage unavoidably occurring during sintering by means of the volume-increasing oxidation reaction of zirconium silicide ($Zr_ySi_x$). The mechanical properties of such reaction-sintered ceramics herein depend to a large extend on the Zr/Si ratio.

H. Salmang and H. Scholse, Keramik, Part 2. Keramische Werkstoffe (Ceramics materials)6$^{th}$. Edition, 1983. Springer Verlag, Pages 168-169 discloses the use of an additive of 0.1 to 0.5 wt % magnesium oxide MgO as sintering aid in the manufacture of aluminum oxide ($Al_2O_3$).

The product information sheet "New Improved Zirconia Powder" of the company Tosoh, Japan, 1999 discloses that an addition of 0.25 wt % aluminum oxide $Al_2O_3$ added as sintering aid to zirconium dioxide reduces the sintering temperature by about 100° C.

It is now the object of the present invention to provide dental ceramics and a method for the manufacture thereof which do not have the limitations and disadvantages mentioned above. Particularly dental ceramics should be provided which permit a shrinkage-free manufacture and which have a low chemical solubility and also a color which facilitates a coloring to the basic dental colors or which permits coloring by coloring agents.

SUMMARY OF THE INVENTION

In dental ceramics containing zirconium dioxide and silicon-dioxide with a Zr/Si ratio of between 0.5 and 1.0, 2 to 12 wt % of aluminum oxide and up to 2 wt % of an alkali- or an earth alkali metal oxide, those materials are selectively mixed with yttrium stabilized zirconium dioxide with a Zr/Si ratio of the mixture being between 0.5 and 1 wt % and also a silicon organic compound as well as a compression aid, and a green body is formed from the mixture which is then shaped by milling sintered.

An oxide-ceramic sinter body according to the invention comprises
zirconium oxide $ZrO_2$ and silicon oxide $SiO_2$, wherein the ratio of the zirconium (Zr) and the silicon (Is) (Zr/Si-ratio) has a value of between 0.5 and 1.0, preferably between 0.7 and 0.9 and optimally about 0.8, wherein with the particularly preferred composition, a composition of 54 wt % to 61 wt % zirconium dioxide and 33 wt % to 37 wt % silicon dioxide is provided,
2 wt % to 12 wt %, particularly preferred 3 wt % to 8 wt % aluminum dioxide $Al_2O_3$,
0 wt % to 2 wt % of an alkali- or earth alkali metal oxide, preferably magnesium oxide MgO, particularly preferred 0.25 wt % to 0.75wt % especially approximately 0.4 wt % magnesium oxide MgO, and wherein the sum of the components mentioned adds up to no more than 100 wt %.

In a particular embodiment the oxide-ceramic sinter body according to the invention may additionally include up to 2 wt %, preferably 1.5 wt % yttrium oxide $Y_2O_3$, which has been added during the manufacture in the form of yttrium-stabilized zirconium dioxide $ZrO_2$.

The chemical solubility of the ceramics according to the invention is substantially below the limit value of 100 mg/cm$^2$ given in the DIN ISO 6872 for dental ceramics. In a preferred embodiment, the chemical solubility is lower than 20 µg/cm$^2$. Particularly preferred are values for the chemical solubility below 10 µg/cm$^2$.

The color of the ceramic material according to the invention is almost white and can therefore easily be colored by pigments to assume the dental base color.

This observation is in accordance with the following preferred values for the parameters L*, a*, and b* in the L*a*b*-system of the Commission Internationale de l'Eclairage (CIE):
L* preferably assumes a value between 92 and 96 that is the cooler of the ceramic material is considered by the retina of the human eye to be light as desired and can be darkened by additives to the dental base colors.
a* preferably has a value of between −2 and +2, preferably between −1.5 and +1.5, that is, the retina of the eye considers it to be white. This color can be changed by suitable pigments to any other desired color b* preferably has a value of between ) and 10, preferably 0 and 4, that is, the ceramic materials are considered by the human retina to be white or slightly yellow which is in accordance with the dental base coloring.

By the addition of at least 1 wt % $Al_2O_3$, the chemical solubility is substantially reduced and by the addition of at least 3 wt % $Al_2O_3$, the ceramic material becomes white and is no longer yellowish. With the addition of magnesium oxide MgO, the sintering behavior is improved whereas the sole addition of aluminum oxide $Al_2O_3$ does not improve the sintering behavior.

Instead of magnesium oxide MgO also other alkaline or earth-alkaline metal oxides such as calcium oxide CaO, in a concentration specific for the respective element may be used, as they can be easily determined by routine testing. The aluminum oxide content also affects the properties of the ceramic material. The effect of the concentration depends on the type of the alkali or earth alkaline metal oxide.

For the manufacture of a ceramic material according to the invention, first a homogeneous mixture of monocline or possibly with yttrium-stabilized zirconium-dioxide $ZrO_2$, aluminum oxide $A_2O_3$, magnesium oxide MgO, and zirconium dioxide $ZrSi_2$ of a silicon-organic compound such as methyl polysiloxane and a compression aid is manufactured. From this homogeneous mixture than a green body is formed which already has the desired shape for example by cutting or milling and which is then densified by a reaction sintering process to become a dental ceramic structure.

In a preferred embodiment, suitable pigments are added to this homogeneous mixture so that the ceramic exhibits exactly the desired color.

In preferred embodiment, the ceramic body can be made so as to be free of shrinkage or have only low shrinkage. To this end, the density of the base body is so selected that the density $P_0$ of the dental ceramics has a value of $$P_D = (m_g/m_G \cdot P_G)$$

wherein $m_g$ is the mass of the green body and $m_D$ is the mass of the dental ceramics. In this way, it is made sure that no sintering shrinkage occurs.

The invention will be described below in greater detail on the basis of a description of three embodiments of the invention.

BRIEF DESCRIPTION OF DRAWINGS

The FIGURE is a measurement of density vs. compression pressure.

DESCRIPTION OF THE EMBODIMENTS

EXAMPLE 1

For the manufacture of dental ceramics according to the invention, the green body consisting of zirconium silicide, monoclinic zirconium dioxide, magnesium dioxide, aluminum dioxide, methyl-polysiloxane and an organic compression additive was densified by a reaction sintering process to a ceramic wherein this dense zirconium-based ceramic had a Zr/Si ratio of 0.8. The magnesium oxide content was 0.4 wt % whereas the aluminum content varied between 0 and 16 wt %. This resulted in the following ceramics.

| | Composition of the ceramic [wt %] | | | | Chemical Solubility | Color measurement (CIE-L*a*b*-System) | | |
|---|---|---|---|---|---|---|---|---|
| No. | $ZrO_2$ | $SiO_2$ | $Al_2O_3$ | MgO | [µg/cm$^2$] | L* | a* | b* |
| 1 | 61.9 | 37.8 | 0.0 | 0.4 | 11.0 | 93.8 | −3.9 | 8.0 |
| 2 | 61.7 | 37.6 | 0.4 | 0.4 | 67.3 | 88.1 | −3.1 | 6.5 |
| 3 | 60.5 | 36.9 | 2.3 | 0.4 | 3.6 | 92.4 | −6.3 | 9.1 |
| 4 | 59.5 | 36.3 | 3.8 | 0.4 | 5.7 | 95.0 | −1.3 | 3.1 |
| 5 | 58.6 | 35.7 | 5.4 | 0.4 | 5.8 | 95.2 | −1.3 | 3.3 |
| 6 | 57.1 | 34.8 | 7.8 | 0.4 | 8.2 | 94.4 | −1.0 | 3.7 |
| 7 | 54.5 | 33.2 | 11.9 | 0.4 | 7.5 | 95.5 | −0.9 | 3.1 |
| 8 | 51.9 | 31.6 | 16.1 | 0.4 | 8.3 | 95.9 | −0.9 | 3.3 |

Additionally, for the dental ceramics No. 4 to No. 8, the sintering densities $P_d$ of the dental ceramics, the mass changes $$\Delta m = (m_D/m_G) - 1$$

and the green densities $P_G$ at an axial compression pressure during the green body manufacture was determined as being between 200 MPa and 600 MPa. In accordance with the relationship:

$$\Delta V = (1 + \Delta m) \cdot (P_G/P_D) - 1$$

The respective volume change ΔV was determined herefrom:

| | | | Compression pressure 200 MPa | | Compression pressure 600 MPa | |
|---|---|---|---|---|---|---|
| Nr. | $P_o$[g/cm$^3$] | Δm[%] | $P_G$[g/cm$^3$] | ΔV[%] | $P_G$[g/cm$^3$] | ΔV[%] |
| 4 | 4.20 | 28.6 | 3.04 | −7.0 | 3.36 | 3.0 |
| 5 | 4.17 | 27.4 | 2.99 | −8.5 | 3.30 | 0.9 |
| 6 | 4.14 | 25.4 | 2.89 | −12.6 | 3.19 | −3.4 |
| 7 | 4.05 | 23.3 | 2.75 | −16.3 | 3.03 | −7.7 |
| 8 | 3.97 | 21.0 | 2.60 | −20.7 | 2.88 | −12.3 |

In the FIGURE, the sinter densities $P_D$ mg/cm$^3$ of the ceramics No. 4 to No. 8 are plotted as curves 4'/5' ... 8' and the values $(1+\Delta m) \times p_G$ [mg/cm$^3$] of the ceramics No. 4 to No. 8 at the given axial compression pressure in MPa during the green body manufacture are plotted as curves 4, 5 ... 8. The ceramics do not exhibit any shrinkage if the respective associated curves 4' and 4, 5' and 5 etc. intersect. This condition is fulfilled by the ceramics No. 4 to No. 6, which therefore are disposed in the especially preferred range. While the points of intersection for the ceramics No. 4 and No. 5 can be directly taken from the FIGURE, for the ceramic No. 6, a compression pressure over 600 MPa is necessary. The ceramics No. 3 and No. 4 which essentially delimit the preferred range are still suitable as dental ceramics.

EXAMPLE 2

For the manufacture of dental ceramics according to the invention, a green body consisting of zirconium disilicide, yttrium-stabilized zirconium dioxide (3 mol % $Y_2O_3$), magnesium oxide, aluminum oxide, methylsiloxane and an organic compression aid was densified by a reaction sintering process, wherein this dense zirconium-based ceramic had a Zr/Is-ratio of 0.8. The magnesium oxide content was 0.4 wt % whereas the aluminum oxide content was varied between 0 and 5.4 wt %. This resulted in the following ceramics.

| | Composition of the ceramic [wt %] | | | | | Chemical Solubility | Color measurement (CIE-L*a*b*-System) | | |
|---|---|---|---|---|---|---|---|---|---|
| No. | $ZrO_2$ | $SiO_2$ | $Al_2O_3$ | MgO | $Y_2O_3$ | [µg/cm$^2$] | L* | a* | b* |
| 9 | 60.4 | 37.7 | 0.0 | 0.4 | 1.5 | 18.3 | 92.3 | −5.3 | 13.5 |
| 10 | 60.2 | 37.6 | 0.4 | 0.4 | 1.5 | 118.0 | 92.8 | −4.5 | 10.4 |
| 11 | 59.0 | 36.9 | 2.3 | 0.4 | 1.5 | 46.4 | 91.3 | −9.0 | 14.7 |
| 12 | 58.1 | 36.3 | 3.8 | 0.4 | 1.4 | 35.7 | 95.3 | −2.3 | 5.0 |
| 13 | 57.1 | 35.7 | 5.4 | 0.4 | 1.4 | 44.6 | 95.8 | −1.2 | 3.0 |

EXAMPLE 3

The manufacture of the dental ceramics according to the invention occurred like in the example 1, wherein herein however, for comparison, the magnesium oxide content was 1.1 or, respectively, 1.2 wt %. In this way, the following ceramics were obtained, wherein the values of the ceramics No. 3 and No. 5 are taken from the example No. 1.

| | Composition of the ceramic [wt %] | | | | Chemical Solubility | Color measurement (CIE-L*a*b*-System) | | |
|---|---|---|---|---|---|---|---|---|
| No. | $ZrO_2$ | $SiO_2$ | $Al_2O_3$ | MgO | [µg/cm$^2$] | L* | a* | b* |
| 3 | 60.5 | 36.9 | 2.3 | 0.4 | 3.6 | 92.4 | −6.3 | 9.1 |
| 5 | 58.6 | 35.7 | 5.4 | 0.4 | 5.8 | 95.2 | −1.3 | 3.3 |
| 14 | 60.0 | 36.6 | 2.3 | 1.1 | 3.7 | 92.0 | −6.2 | 11.2 |
| 15 | 58.1 | 35.4 | 5.4 | 1.2 | 4.4 | 92.0 | −3.2 | 6.5 |

What is claimed is:

1. Dental ceramics for the manufacture of artificial teeth replacements, comprising zirconium dioxide and silicon dioxide with a Zr/Si ratio of between 0.7 and 0.9, 2 wt % to 12 wt % of aluminum oxide and 0.25 wt % to 0.75 wt % of an alkali- or alkaline earth metal oxide.

2. Dental ceramics according to claim 1, including 3 wt % to 8 wt % aluminum oxide and up to 0.25 wt % to 0.75 wt % magnesium oxide.

3. Dental ceramics according to claim 2, having a Zr/Si ratio of approximately 0.8, including 54 to 61 wt % zirconium dioxide and 33 to 37 wt % silicon dioxide.

4. Dental ceramics according to claim 3, including 3 wt %-8 wt % aluminum oxide and 0.25 wt % to 0.75 wt % magnesium oxide.

5. Dental ceramics according to claim 1, having an a$^8$-value for the red/green sensitivity of the retina of a human eye of between −2 and +2 and a b$^4$-value for the yellow/blue sensitivity of the retina of between 0 and 10 as defined in accordance with the CIE-L*a*b-system for color measurements.

6. Dental ceramics according to claim 1, with a chemical solubility of less than 10 µg/cm$^2$.

7. A method for the manufacture of artificial tooth replacements consisting of dental ceramics comprising zirconium dioxide and silicon dioxide with a Zr/Si ratio of between 0.7 and 0.9, 2 wt % to 12 wt % of aluminum oxide and 0.25 wt % to 0.75 wt % of an alkali- or alkaline earth metal oxide, comprising the steps of:
   a) producing a homogeneous mixture of the zirconium-dioxide and zirconium disilicide with a Zr/Si ratio of the mixture being between 0.7 and 0.9 and of aluminum oxide and also a silicon organic compound as well as a compression aid,
   b) forming from the homogeneous mixture a green body by machining it to the desired shape, and
   c) sintering the so formed green body.

8. The method according to claim 7, wherein the zirconium-dioxide is yttrium-stabilized.

9. The method according to claim 7, wherein the green body is shaped by milling.

10. The method according to claim 7, wherein pigments are added to the homogeneous mixture.

11. The method according to claim 7, wherein the density of the green body is so selected that the density $p_D$ of the dental ceramics has a value of $$p_D = (m_D/m_G)p_G$$

wherein $m_G$ is the mass of the green body and $m_D$ is the mass of the dental ceramics.

* * * * *